(12) United States Patent
Hiskens et al.

(10) Patent No.: US 12,506,847 B2
(45) Date of Patent: Dec. 23, 2025

(54) VEHICLE SECURITY SYSTEMS AND METHODS

(71) Applicant: Ford Global Technologies, LLC, Dearborn, MI (US)

(72) Inventors: David Hiskens, Ypsilanti, MI (US); Joshua Wheeler, Trenton, MI (US); Justin Miller, Berkley, MI (US); Jonathan Diedrich, Carleton, MI (US)

( * ) Notice: Subject to any disclaimer, the term of this patent is extended or adjusted under 35 U.S.C. 154(b) by 0 days.

(21) Appl. No.: 18/652,068

(22) Filed: May 1, 2024

(65) Prior Publication Data

US 2025/0343882 A1 Nov. 6, 2025

(51) Int. Cl.
| | |
|---|---|
| H04N 7/18 | (2006.01) |
| G06V 20/40 | (2022.01) |
| G06V 20/56 | (2022.01) |
| H04N 5/76 | (2006.01) |
| H04N 23/61 | (2023.01) |
| H04R 1/02 | (2006.01) |
| H04R 3/04 | (2006.01) |
| B60R 25/30 | (2013.01) |

(52) U.S. Cl.
CPC ............ *H04N 7/188* (2013.01); *G06V 20/44* (2022.01); *G06V 20/56* (2022.01); *H04N 5/76* (2013.01); *H04N 23/61* (2023.01); *H04R 1/028* (2013.01); *H04R 3/04* (2013.01); *B60R 25/305* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 11,741,824 B2 | 8/2023 | Tsuge | |
| 12,026,958 B2* | 7/2024 | Corrodi | B60R 1/26 |
| 2018/0272992 A1* | 9/2018 | Gage | G06V 20/56 |
| 2021/0261140 A1* | 8/2021 | Kallepalle | G06V 20/56 |
| 2021/0397858 A1* | 12/2021 | Buerkle | B60W 60/0016 |

(Continued)

FOREIGN PATENT DOCUMENTS

| | | |
|---|---|---|
| CN | 103144598 A | 6/2013 |
| CN | 110313022 A | 10/2019 |

OTHER PUBLICATIONS

Kami Buchholz, Turning the Vehicle Into a Giant Microphone, Sae International, Feb. 27, 2023, pp. 1-2.

(Continued)

*Primary Examiner* — Daniel T Tekle
(74) *Attorney, Agent, or Firm* — Frank Lollo; Eversheds Sutherland (US) LLP

(57) ABSTRACT

A vehicle having a vehicle camera, a detection unit, and a processor is disclosed. The vehicle camera may be configured to capture a video feed in a camera field of view. The detection unit may be configured to measure vibrations caused by malicious events associated with the vehicle. The processor may be configured to obtain a trigger signal, and activate the detection unit responsive to obtaining the trigger signal. The processor may obtain input from the detection unit responsive to activating the detection unit, and detect a malicious event associated with the vehicle based on the input. The processor may further control a vehicle camera operation responsive to detecting the malicious event.

20 Claims, 6 Drawing Sheets

(56) References Cited

U.S. PATENT DOCUMENTS

2023/0343104 A1* 10/2023 Ogorodnikov ......... G06V 20/58
2023/0386268 A1* 11/2023 Scarbrough ............ H04N 7/183

OTHER PUBLICATIONS

David Lane, Car Alarm System, https://digitalcommons.calpoly.edu/eesp/138, Mar. 20, 2012, pp. 1-74.
Knowles Electronics, LLC, Knowles Microphones and Vibration Sensors for Automotive Applications Selection Guide, Dec. 13, 2023, pp. 1-4.

* cited by examiner

VEHICLE SECURITY SYSTEMS AND METHODS

FIELD

The present disclosure relates to vehicles and more particularly to vehicle security systems and methods to detect and capture malicious events.

BACKGROUND

Many modern vehicles have various security features to detect and address potential threats associated with the vehicles. In addition, many vehicles have security features that may be used to capture malicious events when the vehicles may be powered off and parked. For example, a vehicle camera may record and save video data in a vehicle memory, when the vehicle may be powered off and parked. When a vehicle owner notices a malicious activity/event associated with the vehicle, the owner may fetch and view the stored video recordings to understand the reason behind the malicious event and/or to determine an identity of a malicious user who may have caused the malicious event.

However, in some cases, the vehicle may not capture details of such events efficiently. Thus, there exists a need for a system and method to efficiently capture data associated with malicious activities/events.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
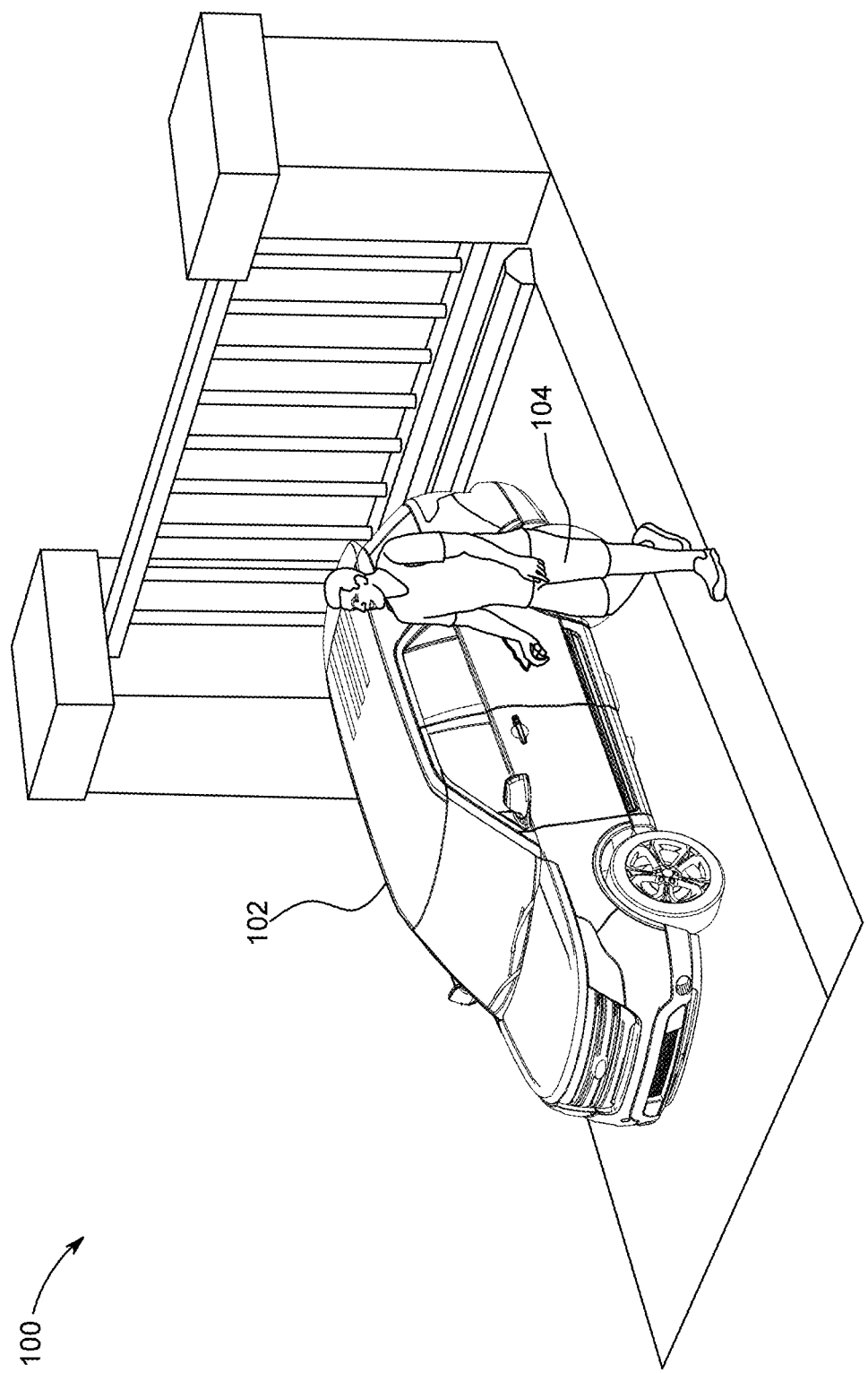
FIG. 1 depicts an example environment in which techniques and structures for providing the systems and methods disclosed herein may be implemented.

The present disclosure describes a system and method that may detect a malicious activity/event associated with a vehicle, and control a vehicle camera operation based on the detection. Specifically, the system may cause the vehicle camera to record a video feed associated with the malicious event and store the video feed in a vehicle memory, when the system detects the malicious event.

In some aspects, to detect the malicious event, the system may obtain inputs from a vehicle microphone, and detect the malicious event based on the inputs obtained from the microphone. In some aspects, the system may detect even small malicious events such as act of keying, rubbing of hand against a vehicle exterior surface or contacting the vehicle exterior surface, bumping of the vehicle door by another vehicle, etc., by using the inputs obtained from the microphone. The microphone may be configured to detect vibrations that may be caused by the malicious events, and the system may use information associated with the detected vibrations to determine that the malicious event may have happened. The microphone may be located anywhere on the vehicle. In an exemplary aspect, the microphone may be located on a vehicle exterior surface/portion, such as on the B-pillar, a vehicle door, etc.

In some aspects, the system may detect the malicious event when the sound pressure level associated with the measured vibrations may be greater than a threshold value. In addition, the system may be configured to identify a malicious event type (e.g., vehicle keying) based on the inputs obtained from the microphone. Specifically, the system may obtain sound pressure level (SPL) associated with the measured vibrations, and may apply one or more filters, such as high-pass filter and low-pass filter, to differentiate between different malicious events.

In some aspects, the system may activate the microphone to detect the vibrations associated with the malicious event described above when a predetermined condition may be met. For example, the system may activate the microphone when one or more vehicle sensors, such as a radio detection and ranging (radar) sensor, a light detection and ranging (lidar) sensor, one or more ultrasonic sensors, etc., detect motion (e.g., a person movement) in proximity to the vehicle. The microphone may monitor the vibrations responsive to the system activating the microphone.

In some aspects, in addition to the microphone, the vehicle may include an accelerometer that may be configured to detect large malicious events (e.g., vehicle tilting). The system may detect the malicious event when the accelerometer measures a force that is greater than a threshold force value.

The present disclosure discloses a system and method that facilitates detection of even small malicious events associated with a vehicle, such as vehicle keying. In addition, the system allows the vehicle camera to save the video feed(s) in the vehicle memory only when the system detects the malicious activity and not otherwise, thereby facilitating storage of relevant video feed(s) and saving memory space. These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a van, a minivan, a truck, a taxi, a bus, etc. Further, the vehicle 102 may be a manually driven vehicle and/or be configured to operate in a fully autonomous (e.g., driverless) mode and/or partially autonomous mode. In some aspects, the vehicle 102 may include a traction battery or battery pack ("vehicle battery", not shown) that may provide energy for vehicle propulsion. In other aspects, the vehicle 102 may include any other powertrain such as a gasoline engine. Although FIG. 1 depicts a four-wheeler vehicle, the present disclosure may also be applied to two-wheeler vehicles such as electric bicycles, scooters, motorcycles, etc.

In some aspects, the vehicle 102 may include a security unit (shown as security unit 214 in FIG. 2) that may be configured to detect a malicious event associated with the vehicle 102 and control a vehicle component operation based on the detection, when the vehicle 102 may be powered off or when the vehicle engine may be switched off. The malicious event may be a "small-effect" event such as vehicle keying by a person 104, rubbing of hand against a vehicle exterior surface or contacting the vehicle exterior surface, bumping of a vehicle door by another vehicle, and/or the like.

In some aspects, the vehicle 102 may include a microphone (shown as microphone 238 in FIG. 2) that may be configured to measure vibrations (e.g., sound wave vibrations) caused by the malicious event. The microphone may be designed as a vibration transducer. In some aspects, the microphone may be disposed at a vehicle exterior surface/portion. For example, the microphone may be disposed on a large flat surface such as a body panel or a door panel. In an exemplary aspect, the microphone may be disposed on a B-pillar applique or on a door skin. In some aspects, the vehicle 102 may include a plurality of microphones that may be disposed on the vehicle exterior surface/portion.

The security unit or "unit" may be configured to obtain inputs from the microphone, and detect the malicious event based on the inputs. Specifically, the unit may obtain the sound pressure level (SPL) or signals associated with the measured vibrations from the microphone, and determine whether the SPL is greater than a threshold value. The unit may detect the malicious event associated with the vehicle 102, when the SPL may be greater than the threshold value. Responsive to determining the malicious event, the unit may control a vehicle component operation. Specifically, the unit may control an operation of a vehicle camera (e.g., a vehicle exterior camera) such that the vehicle camera may capture images/videos associated with the malicious event. For example, the unit may transmit a command to the vehicle camera to record a video feed associated with the malicious activity/event, and save the video feed in a vehicle memory (shown as memory 252 in FIG. 2). When a vehicle owner notices/observes any instance (e.g., vehicle keying) associated with the vehicle 102, the vehicle owner may fetch video feeds from the vehicle memory to view the details. For example, the vehicle owner may identify the person 104 who may have performed the act of vehicle keying by analyzing the stored videos.

A person ordinarily skilled in the art may appreciate that in some instances, to save memory space, the vehicle camera may not ordinarily save the video feed in the vehicle memory when the vehicle 102 may be powered off. The security unit, as described in the present disclosure, causes the vehicle camera to store the video feed associated with the malicious event when the unit detects such an event (and not otherwise). In this manner, the unit may ensure that the owner gets access to important video feeds that may assist the owner in identifying the person 104 who may have caused the malicious event, while at the same time ensuring that the memory space is not unnecessarily consumed by video feeds that may not be associated with the malicious event (and hence may not necessarily be of use to the owner).

In further aspects, the unit may apply one or more filters on the SPL obtained from the microphone, and detect a malicious event type responsive to applying the filters. Stated another way, the unit may apply the filters to differentiate between types of malicious events, and identify a malicious event type that may have happened on the vehicle 102. For example, the unit may apply a low pass filter (e.g., 200 Hz low-pass filter) and/or a high pass filter (e.g., 2000 Hz high-pass filter) on the SPL to detect whether the malicious event is vehicle keying by a person 104, rubbing of hand against a vehicle exterior surface or contacting the vehicle exterior surface, or bumping the vehicle door by another vehicle. In some aspects, responsive to identifying the malicious event type, the unit may tag the video feed while storing the video feed. The tag may be associated with the malicious event type. The tagging of the video feed may facilitate the vehicle owner to conveniently identify relevant video feed and details associated with the malicious events.

As described above, the unit detects the malicious event based on the inputs obtained from the microphone. However, in some aspects, the unit may first activate the microphone before obtaining the inputs from the microphone. In some aspects, when the vehicle 102 may be powered off, the vehicle 102 may cause the microphone to move to a low power state to conserve vehicle energy. The unit may activate the microphone or "wake up" the microphone (so that the microphone may capture the inputs described above) when a predetermined condition may be met or when the unit obtains a trigger signal. In some aspects, the predetermined condition may be met or the unit may obtain the trigger signal when a vehicle detection unit detects motion in proximity to the vehicle 102. The vehicle detection unit may be, for example, a vehicle camera, a radio detection and ranging (radar) sensor, a light detection and ranging (lidar) sensor, an ultrasonic sensor, etc.

Responsive to the microphone being activated, the microphone may capture the inputs associated with the malicious event, as described above. In this manner, the vehicle 102 ensures that vehicle energy is not unnecessarily consumed, and the microphone is activated only when the trigger signal is obtained.

Further vehicle details are described below in conjunction with FIG. 2.

The vehicle 102 implements and/or performs operations, as described here in the present disclosure, in accordance with the owner manual and safety guidelines. In addition, any action taken by the vehicle owner based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
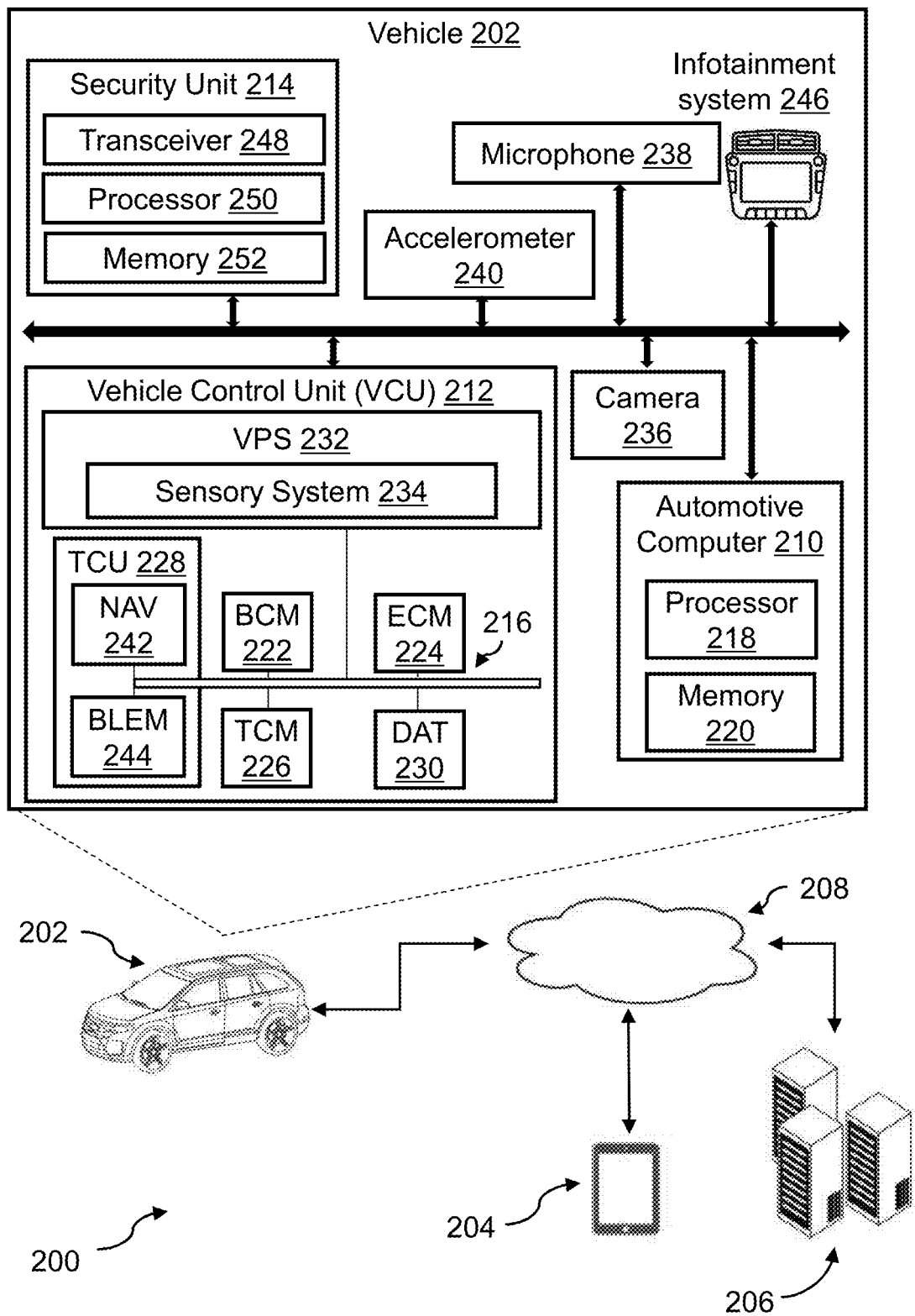
FIG. 2 depicts a block diagram of an example system for detecting a malicious activity and controlling a vehicle component operation in accordance with the present disclosure.
Figure 3:
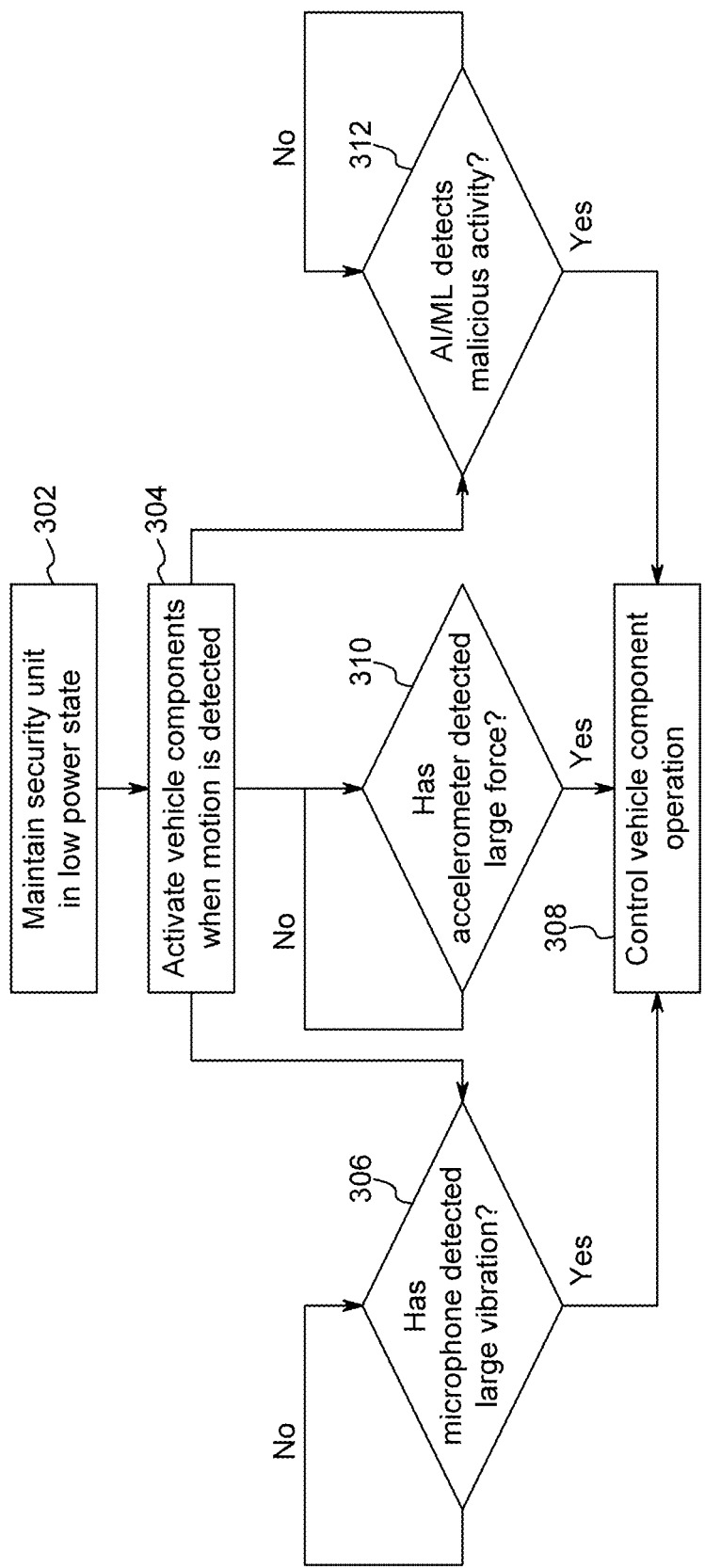
FIG. 3 depicts a flow diagram of a first example method for detecting a malicious activity and controlling a vehicle component operation in accordance with the present disclosure.

FIG. 2 depicts a block diagram of an example system 200 for detecting a malicious activity and controlling a vehicle component operation in accordance with the present disclosure. While explaining FIG. 2, references will be made to FIG. 3. FIG. 3 depicts a flow diagram of a first example method 300 for detecting the malicious activity and controlling the vehicle component operation in accordance with the present disclosure.

The system 200 may include a vehicle 202, a user device 204, and one or more servers 206 communicatively coupled with each other via one or more networks 208. The vehicle 202 may be same as the vehicle 102 described above in conjunction with FIG. 1. The user device 204 may be associated with the vehicle owner/user, and may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In further aspects, the server(s) 206 may receive information captured by the vehicle 202 (e.g., images captured by vehicle camera(s)) and store the received information in a server database. The vehicle user may fetch the stored information from the server 206, if required, via the user device 204 or a vehicle component (e.g., an infotainment system 246, described below).

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, Bluetooth Low Energy (BLE), Wi-Fi based on the Institute of Electrical and Electronics Engineers (IEEE) standard 802.11, ultra-wide-band (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a security unit 214. The VCU 212 may include a plurality of Electronic Control Units (ECUs) 216 disposed in communication with the automotive computer 210.

The user device 204 may connect with the automotive computer 210 and/or the security unit 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the security unit 214 may be installed anywhere in the vehicle 202, in accordance with the disclosure. Further, the automotive computer 210 may operate as a functional part of the security unit 214. The automotive computer 210 may be or include an electronic vehicle controller, having one or more processor(s) 218 and a memory 220. Moreover, the security unit 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable medium or memory storing security program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 can include or communicate with any combination of the ECUs 216, such as a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging ("radar") sensor configured for detection and localization of objects inside and outside the vehicle 202 using radio waves, sitting area buckle sensors, sitting area sensors, a Light Detecting and Ranging ("lidar") sensor, an ultrasonic sensor, door sensors, proximity sensors, temperature sensors, wheel sensors, ambient weather sensors, one or more vehicle cameras 236, steering wheel sensors, one or more microphones 238, an accelerometer 240, etc. In some aspects, the vehicle camera(s) 236 may be configured to capture images and videos (or video feed) in respective camera's field of view. In some aspects, the vehicle cameras 236 may include vehicle external cameras that may capture images/videos associated with the malicious event that may happen on the vehicle 202 (which may enable the vehicle owner to know/view the identity of the person 104, e.g., a face of the person 104 who performed the act of vehicle keying). The microphone 238 (or audio transducer) may be configured to measure vibrations/audio sound caused by the malicious event (e.g., small malicious events such as vehicle keying, as described above). The accelerometer 240 may be configured to measure a large force (that may be applied to the vehicle 202) to detect malicious events such as vehicle tilting (or other large malicious events). In further aspects, the vehicle sensory system 234 may be configured to detect motion in proximity to the vehicle 202. For example, the vehicle camera 236, the radar sensor, the lidar sensor, the ultrasonic sensors, etc. disposed in the vehicle 202 may be configured to detect any motion in proximity to the vehicle 202 (e.g., when a user, an animal or any object moves in proximity to the vehicle 202).

In some aspects, the VCU 212 may control vehicle operational aspects and implement one or more instruction sets received from the user device 204, from one or more instruction sets stored in the memory 220, including instructions operational as part of the security unit 214.

The TCU 228 may be configured and/or programmed to provide vehicle connectivity to wireless computing systems onboard and off board the vehicle 202, and may include a Navigation (NAV) receiver 242 for receiving and processing a GPS signal, a BLE Module (BLEM) 244, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the security unit 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, wipers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, among other features. The DAT controller 230 may also provide aspects of user and environmental inputs usable for user authentication.

In some aspects, the automotive computer 210 may connect with an infotainment system 246. The infotainment system 246 may include a touchscreen interface portion, and may include voice recognition features, biometric identification capabilities that can identify users based on facial recognition, voice recognition, fingerprint identification, or other biological identification means. In other aspects, the infotainment system 246 may be further configured to receive user instructions/request via the touchscreen interface portion, and/or display notifications (including visual alert notifications), navigation maps, etc. on the touchscreen interface portion.

The computing system architecture of the automotive computer 210, the VCU 212, and/or the security unit 214 may omit certain computing modules. It should be readily understood that the computing environment depicted in FIG. 2 is an example of a possible implementation according to the present disclosure, and thus, it should not be considered limiting or exclusive.

In accordance with some aspects, the security unit 214 may be integrated with and/or executed as part of the ECUs 216. The security unit 214, regardless of whether it is integrated with the automotive computer 210 or the ECUs 216, or whether it operates as an independent computing system in the vehicle 202, may include a transceiver 248, a processor 250, and a computer-readable memory 252, which are communicatively coupled with each other.

The transceiver 248 may be configured to receive information/inputs from one or more external devices or systems, e.g., the user device 204, the server(s) 206, and/or the like via the network 208. Further, the transceiver 248 may transmit notifications (e.g., alert/alarm signals) to the external devices or systems. In addition, the transceiver 248 may be configured to receive information/inputs from vehicle components such as the vehicle sensory system 234 (including the vehicle camera 236, the microphone 238, the accelerometer 240, etc.), the infotainment system 246, and/or the like. Further, the transceiver 248 may transmit notifications (e.g., alert/alarm signals) to the vehicle components such as the infotainment system 246, the BCM 222, etc.

The processor 250 and the memory 252 may be same as or similar to the processor 218 and the memory 220, respectively. In some aspects, the processor 250 may utilize the memory 252 to store programs in code and/or to store data for performing aspects in accordance with the disclosure. The memory 252 may be a non-transitory computer-readable medium or memory storing the security program code. In some aspects, the memory 252 may additionally store information associated with the vehicle 202 and one or more sensory inputs received from the vehicle sensory system 234 (such as video feeds or images captured by the vehicle camera 236).

In operation, when the vehicle 202 may be powered off or when the vehicle ignition is switched off, the processor 250 may maintain the security unit 214 in a low power state or low power mode, as shown in a step 302 of FIG. 3. In some aspects, the processor 250 may maintain the low power mode of the security unit 214 until the processor 250 receives/obtains a trigger signal (or when a predetermined condition may be met). In some aspects, the processor 250 may obtain the trigger signal when the vehicle sensory system 234 (e.g., the radar sensor, the lidar sensors, the ultrasonic sensor, the vehicle camera 236, etc.) detects motion in proximity to the vehicle 202. For example, the processor 250 may obtain the trigger signal from the vehicle sensory system 234 when the vehicle sensory system 234 detects that the person 104 may be present in proximity to the vehicle 202.

Responsive to obtaining the trigger signal from the vehicle sensory system 234, the processor 250 may activate one or more vehicle components to capture information associated with one or more malicious events (associated with the vehicle 202), as shown in step 304 of FIG. 3. The vehicle components that may be activated may include, but are not limited to, the vehicle camera 236, the microphone 238, the accelerometer 240, and/or the like. In some aspects, the processor 250 may transmit a wakeup signal to the vehicle components to activate the vehicle components. In some aspects, the processor 250 may transmit the wakeup signal to all the vehicle components simultaneously when the processor 250 obtains the trigger signal. In other aspects, the processor 250 may transmit the wakeup signal to the vehicle components sequentially or selectively.

When the vehicle components receive the wakeup signal from the processor 250, the vehicle components may commence to capture information associated with the malicious event. For example, when the microphone 238 receives the wakeup/activation signal, the microphone 238 may commence to measure/monitor vibrations that may be caused by the malicious events. Further, responsive to getting activated (or "woken-up"), the vehicle components may continue to capture information associated with the malicious event for a predefined time duration.

Responsive to activating the vehicle components, the processor 250 may obtain inputs from the vehicle components, and detect a malicious event (e.g., a first malicious event) associated with the vehicle 202 based on the obtained inputs. In some aspects, the processor 250 may obtain the inputs from the microphone 238 (e.g., information associated with the measured vibrations), and detect the malicious event based on the obtained vibration information. Specifically, the processor 250 may obtain sound pressure level (SPL) or signals associated with the measured vibrations, and compare the SPL with a threshold value. Based on the comparison, the processor 250 may determine whether the SPL is greater than the threshold value (or whether the microphone 238 has detected large vibrations, as shown in step 306 of FIG. 3). The processor 250 may detect that the malicious event may have happened when the processor 250 determines that the SPL is greater than the threshold value. Responsive to detecting the malicious event, the processor 250 may control operation of the vehicle camera 236, as shown in step 308 of FIG. 3. Specifically, when the processor 250 detects the malicious event, the processor 250 may cause the vehicle camera 236 to record the video feed(s) associated with the malicious event (in the camera's field of view (FOV)), and save the video feed(s) in the memory 252.

In further aspects, in addition to detecting that the malicious event may have happened, the processor 250 may identify a malicious event type based on the obtained SPL. For example, the processor 250 may detect/identify whether the malicious event is vehicle keying by the person 104, rubbing of hand against a vehicle exterior surface or contacting the vehicle exterior surface, or bumping of the vehicle door by another vehicle, and/or the like. In some aspects, the processor 250 may identify the malicious event type (or differentiate between different malicious events) by applying one or more filters on the SPL/signals associated with measured vibrations (measured by the microphone 238). For example, the processor 250 may apply a low pass filter (e.g., 200 Hz low-pass filter) and/or a high pass filter (e.g., 2000 Hz high-pass filter) on the SPL to detect whether the malicious event is vehicle keying by the person 104, rubbing of hand against a vehicle exterior surface or contacting the vehicle exterior surface, or bumping of the vehicle door by another vehicle. In some aspects, responsive to identifying the malicious event type, the processor 250 may tag the video feed while storing the video feed. The tag may be associated with the malicious event type. The tagging of video feed may facilitate the vehicle owner to conveniently identify relevant video feed and details associated with the malicious events.

In further aspects, the processor 250 may obtain inputs from the accelerometer 240 (after activating the accelerometer 240) and detect another malicious event (or a second malicious event such as vehicle tilting) based on the obtained inputs. For example, the processor 250 may obtain information associated with a force detected by the accelerometer 240, and compare the detected force with a threshold value (or a threshold force value). Based on the comparison, the processor 250 may determine whether the detected force is greater than the threshold value (or whether the accelerometer 240 has detected a large force, as shown in step 310 of FIG. 3). The processor 250 may detect the second malicious event when the processor 250 determines that the detected force is greater than the threshold value. Responsive to detecting the second malicious event, the processor 250 may control operation of the vehicle camera 236, as shown in the step 308 of FIG. 3 and in the manner described above. Specifically, when the processor 250 detects the second malicious event, the processor 250 may cause the vehicle camera 236 to record video feed(s) associated with the malicious event (in camera's FOV), and save the video feed(s) in the memory 252.

In additional or alternative aspects, the processor 250 may obtain inputs from the vehicle camera 236, and detect a malicious event (e.g., a third malicious event such as any suspicious behavior in proximity to the vehicle 202) based on the inputs. For example, the processor 250 may detect the malicious event by analyzing the images/videos captured by the vehicle camera 236. In some aspects, the third malicious event may be same as the first or second malicious event. In other aspects, the third malicious event may be different from the first or second malicious event. In this case, the processor 250 may obtain one or more video feeds from the vehicle camera 236, and execute one or more image processing algorithms (that may be pre-stored in the memory 252) on the video feeds. Specifically, the processor 250 may execute one or more Artificial Intelligence/Machine Learning (AI/ML) based image processing algorithms on the video feeds captured by the vehicle camera 236, and determine/detect the third malicious event based on the AI/ML based image processing (as shown in step 312 in FIG. 3). Responsive to detecting the third malicious event, the processor 250 may control operation of the vehicle camera 236, as shown in the step 308 of FIG. 3 and in the manner described above. Specifically, when the processor 250 detects the third malicious event, the processor 250 may cause the vehicle camera 236 to save the video feed(s) in the memory 252. On the other hand, when the processor 250 does not detect the third malicious event, the processor 250 may not cause the vehicle camera 236 to save the video feed(s) in the memory 252.

In some aspects, the processor 250 may obtain the inputs from all the vehicle components simultaneously, and perform the steps 306, 310 and 312 of FIG. 3 simultaneously. In other aspects, the processor 250 may obtain the inputs from the vehicle components sequentially or selectively, and perform the steps 306, 310 and 312 of FIG. 3 sequentially. For example, the processor 250 may first obtain the inputs from the vehicle camera 236, detect the malicious event (e.g., first/second/third malicious event) based on the inputs obtained from the vehicle camera 236. When the processor 250 does not detect the malicious event by using the vehicle camera 236, the processor 250 may then obtain inputs from the microphone 238. The processor 250 may then detect the malicious event based on the inputs obtained from the microphone 238. When the processor 250 does not detect the malicious event by using the microphone 238, the processor 250 may obtain the inputs from the accelerometer 240 and then detect the malicious event based on the inputs obtained from the accelerometer 240. In some aspects, when the processor 250 detects the malicious event from any of the vehicle components described above, the processor 250 may cause the vehicle camera 236 to record and save video feed(s) in the memory 252. On the other hand, when the processor 250 does not detect the malicious event from any of the vehicle components, the processor 250 may not cause the vehicle camera 236 to record and/or save video feed(s) in the memory 252, thereby saving/storing selective video feed(s) in the vehicle memory 252 which may be required to investigate the malicious event.

In additional aspects, the processor 250 may obtain inputs from ultrasonic transducers (in addition or alternative to the microphone 238) to detect the malicious events described above. In further aspects, the processor 250 may be configured to output a voice message or an alert, via a vehicle speaker, when the processor 250 detects the malicious event. For example, the processor 250 may output the alert to the person 104. In further aspects, the processor 250 may control vehicle lights to alert the person 104. In further aspects, the processor 250 may be configured to output, via the transceiver 248, a notification to the user device 204 responsive to detecting the malicious event, indicating the occurrence of the malicious event. In some aspects, the notification may include the malicious event type.

Figure 4A:
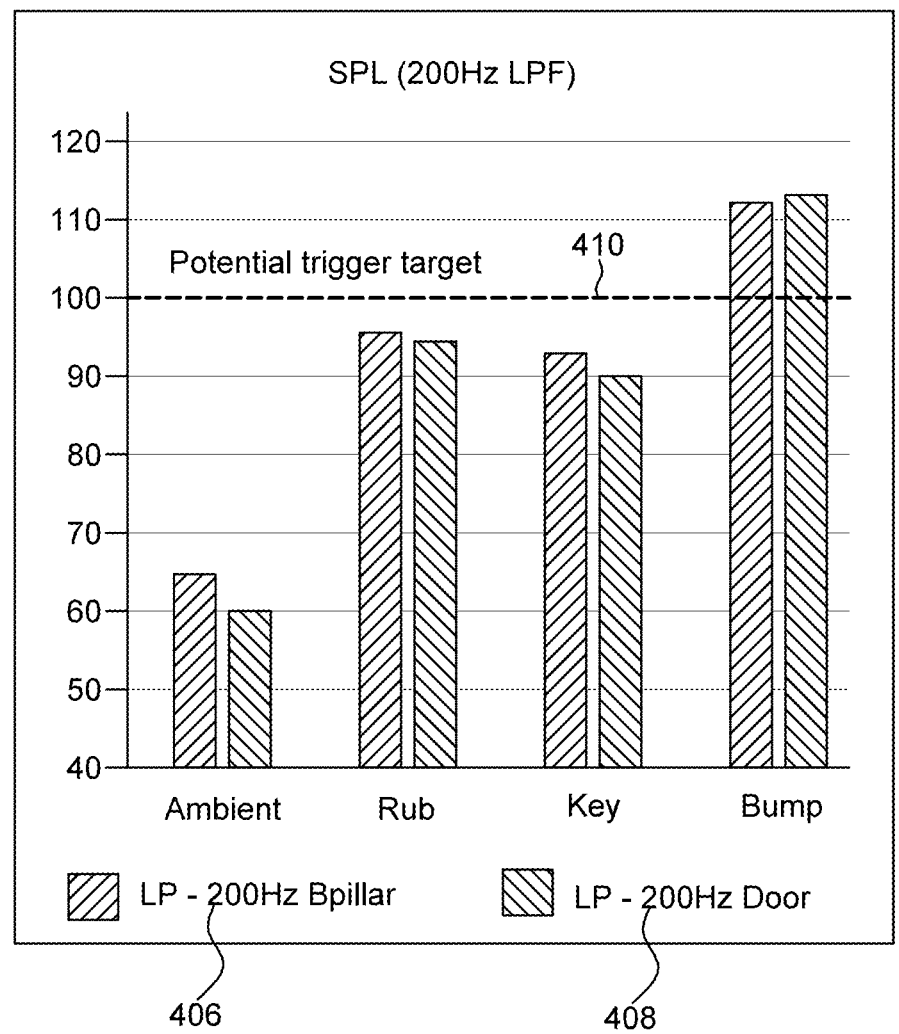
FIGS. 4A and 4B depict graphical results obtained from a detection unit in accordance with the present disclosure.
Figure 4B:
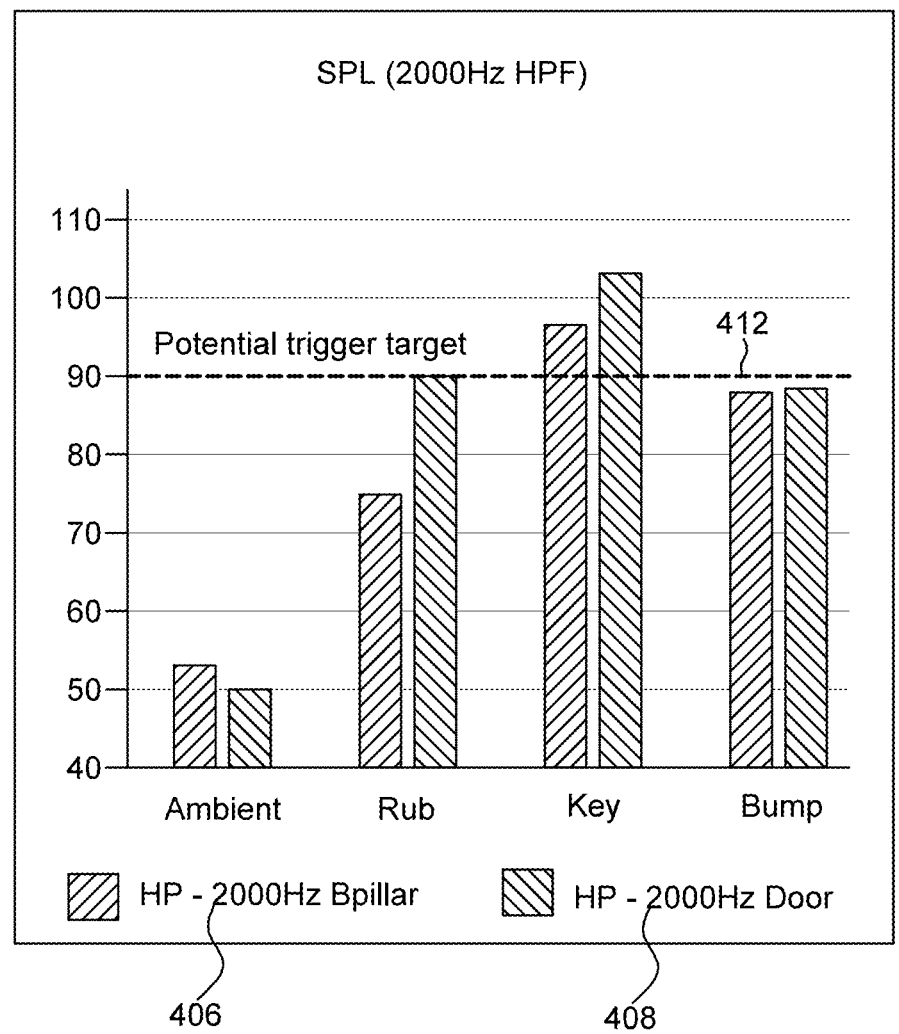

FIGS. 4A and 4B depict graphical results 402, 404 obtained from a detection unit (e.g., the microphone 238) in accordance with the present disclosure. The graphical result 402 is obtained when a low-pass (LP) filter is applied on the sound pressure level (SPL), and the graphical result 404 is obtained when a high-pass (HP) filter is applied on the SPL.

Each of the graphical results includes an X axis representing different malicious events (including rubbing, keying, bumping, etc., and ambient level (when there is no contact)) that may be detected by using the microphone 238, and a Y axis representing sound pressure level in decibel (dB). Each result indicates the SPL captured by the microphone 238 when the microphone 238 is disposed at B-pillar (that may detect airborne sound), as shown by legend 406, and when the microphone 238 is disposed at a vehicle door (that may detect structure-borne sound), as shown by legend 408.

As described above, applying different filters to the SPL allows the processor 250 to differentiate between keying, door bumps, and other small events. In some aspects, the processor 250 may apply a 200 Hz low-pass filter to the signal/SPL, and compare the SPL with respective threshold values of malicious events associated with the vehicle 202 (shown as a potential trigger target 410 in FIG. 4). Based on the comparison, the processor 250 may isolate the sound to detect a malicious event. For example, when the SPL is greater than a threshold value associated with the bump (or door bump), the processor 250 may identity bump as the malicious event type. Similarly, the processor 250 may apply a 2000 Hz high-pass filter to the signal/SPL and isolate the sound to detect keying. For example, when the processor 250 applies the 2000 Hz high-pass filter, the processor 250 may compare the SPL with respective threshold values of malicious events associated with the vehicle 202 (shown as a potential trigger target 412 in FIG. 4). Based on the comparison, the processor 250 may isolate the sound to detect the malicious event as vehicle keying, as described above.

Figure 5:
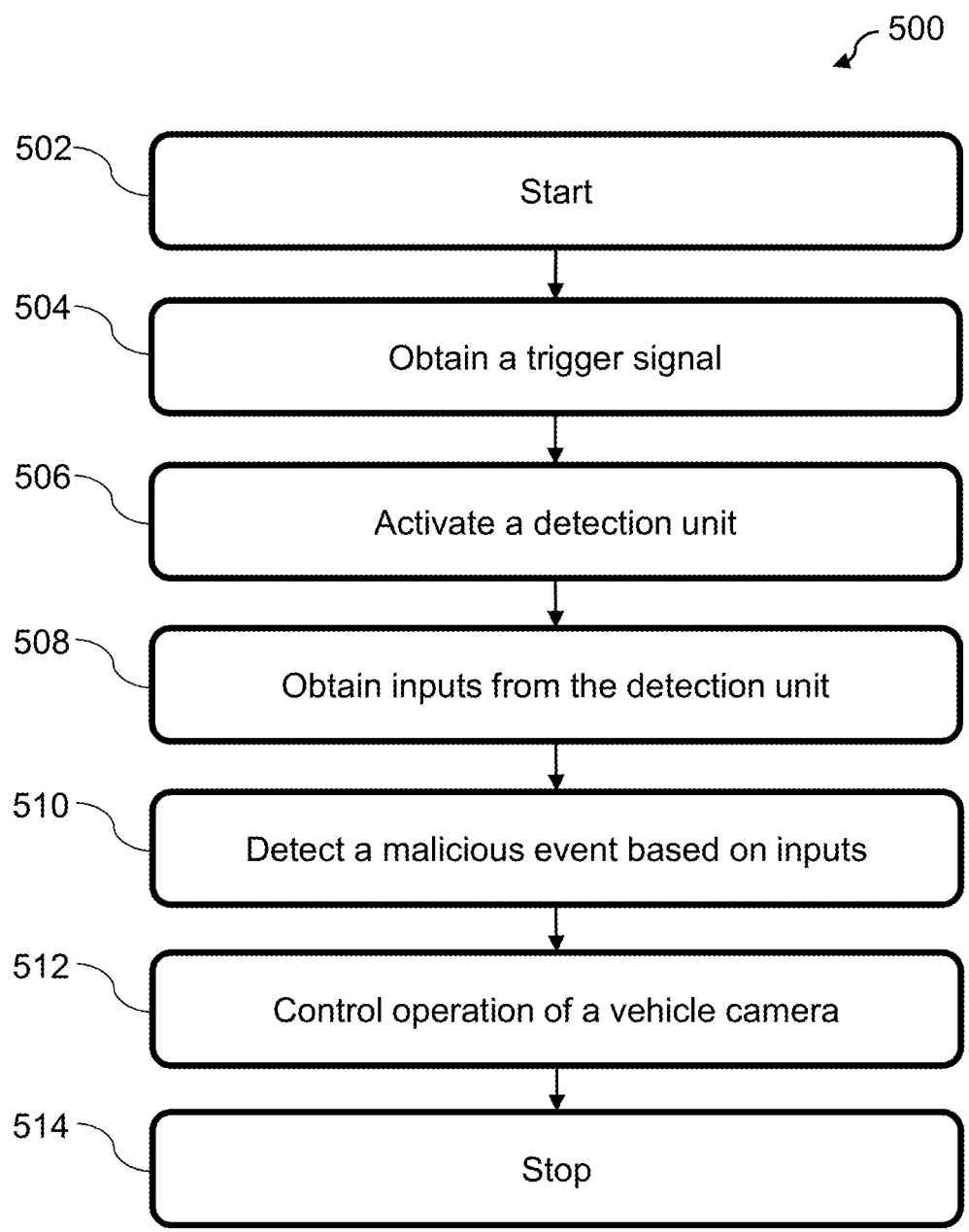
FIG. 5 depicts a flow diagram of a second example method for detecting a malicious activity and controlling a vehicle component operation in accordance with the present disclosure.

FIG. 5 depicts a flow diagram of a second example method 500 for detecting a malicious activity and controlling a vehicle component operation in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

Referring to FIG. 5, at step 502, the method 500 may commence. At step 504, the method 500 may include obtaining, by the processor 250, a trigger signal. The processor 250 may receive the trigger signal when the vehicle sensory system 234 detects motion in proximity to the vehicle 202.

At step 506, the method 500 may include activating, by the processor 250, a detection unit responsive to obtaining the trigger signal. The detection unit may be configured to measure vibrations caused by malicious events. In some aspects, the detection unit may be the microphone 238. At step 508, the method 500 may include obtaining, by the processor 250, inputs from the detection unit, responsive to activating the detection unit.

At step 510, the method 500 may include detecting, by the processor 250, a malicious event based on the inputs. For example, the processor 250 may detect the act of keying a vehicle door, rubbing of hand against a vehicle exterior surface, or bumping of the vehicle door by another vehicle, based on the inputs obtained from the microphone 238.

At step 512, the method 500 may include controlling, by the processor 250, the operation of the vehicle camera 236 responsive to detecting the malicious event. For example, the processor 250 may cause the vehicle camera 236 to record a video feed in the camera's FOV and save the video feed in the memory 252. At step 514, the method 500 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a vehicle camera configured to capture a video feed in a camera field of view;
    a first detection unit configured to measure vibrations caused by malicious events associated with the vehicle;
    a processor communicatively coupled to the vehicle camera and the first detection unit, wherein the processor is configured to:
        obtain a trigger signal;
        activate the first detection unit responsive to obtaining the trigger signal;
        obtain an input from the first detection unit responsive to activating the first detection unit;
        apply a first filter to the input;
        identify a type of a first malicious event associated with the vehicle based on applying the first filter to the input; and
        control a vehicle camera operation responsive to detecting the first malicious event.

2. The vehicle of claim 1, wherein the first filter is a low-pass filter, and wherein the first malicious event is identified based on a first threshold value associated with the low-pass filter.

3. The vehicle of claim 1, wherein the first detection unit is a microphone disposed at a vehicle door and configured to detect structure-borne sound.

4. The vehicle of claim 1, wherein the processor is further configured to:
    compare a sound pressure level, associated with the measured vibrations, with a threshold value;
    determine that the sound pressure level is greater than the threshold value based on the comparison; and
    detect the first malicious event responsive to a determination that the sound pressure level is greater than the threshold value.

5. The vehicle of claim 4, wherein the processor is further configured to:
    apply one or more filters on the sound pressure level; and
    detect a malicious event type responsive to applying the one or more filters.

6. The vehicle of claim 5, wherein the malicious event type comprises at least one of: keying a vehicle door, rubbing of hand against a vehicle exterior surface, or bumping the vehicle door by another vehicle.

7. The vehicle of claim 1, wherein the processor controls the vehicle camera by causing the vehicle camera to record the video feed in the camera field of view and save the video feed in a vehicle memory.

8. The vehicle of claim 1, wherein the processor is further configured to:
    obtain one or more video feeds from the vehicle camera;
    perform image processing on the one or more video feeds;
    detect a second malicious event based on the image processing; and
    save the one or more video feeds responsive to detecting the second malicious event.

9. The vehicle of claim 1, further comprising an accelerometer configured to measure a force applied to the vehicle.

10. The vehicle of claim 9, wherein the processor is further configured to:
    obtain inputs from the accelerometer;
    detect a third malicious event based on the inputs; and
    control the vehicle camera operation responsive to detecting the third malicious event.

11. The vehicle of claim 1, wherein the first filter is at least one of a low-pass filter associated with a first threshold value selected for identifying a first type of malicious event or a high-pass filter associated with a second threshold value selected for identifying a second type of malicious event.

12. The vehicle of claim 1, wherein the first detection unit is a microphone operable as a vibration transducer, and wherein the processor is configured to:
    apply the first filter to vibrations produced by the microphone; and
    identify the first malicious event based on applying the first filter to the vibrations produced by the microphone.

13. The vehicle of claim 1, wherein the first detection unit is a microphone and wherein the processor is further configured to:
    determine that the vehicle is powered off; and
    move the microphone to a low power state based on determining that the vehicle is powered off.

14. A method comprising:
    obtaining, by a processor, a trigger signal;
    activating, by the processor, a first detection unit responsive to obtaining the trigger signal, wherein the first detection unit is configured to measure vibrations caused by malicious events associated with a vehicle;
    obtaining, by the processor, an input from the first detection unit responsive to activating the first detection unit;
    applying, by the processor, a first filter to the input;
    identifying, by the processor, a type of a malicious event associated with the vehicle based on applying the first filter to the input; and
    controlling, by the processor, operation of a vehicle camera responsive to detecting the malicious event, wherein the vehicle camera is configured to capture a video feed in a camera field of view.

15. The method of claim 14, further comprising:
    comparing a sound pressure level, associated with the measured vibrations, with a threshold value;
    determining that the sound pressure level is greater than the threshold value based on the comparison; and
    detecting the malicious event responsive to a determination that the sound pressure level is greater than the threshold value.

16. The method of claim 15, further comprising:
applying one or more filters on the sound pressure level; and
detecting a malicious event type responsive to applying the one or more filters.

17. The method of claim 16, wherein the malicious event type comprises at least one of: keying a vehicle door, rubbing of hand against a vehicle exterior surface, or bumping the vehicle door by another vehicle.

18. The method of claim 14, wherein controlling operation of the vehicle camera comprises controlling the vehicle camera to record the video feed in the camera field of view and save the video feed in a vehicle memory.

19. The method of claim 14, wherein the obtaining the trigger signal comprises obtaining the trigger signal when a second detection unit detects motion in proximity to the vehicle.

20. A non-transitory computer-readable storage medium in a distributed computing system, the non-transitory computer-readable storage medium having instructions stored thereupon which, when executed by a processor, cause the processor to:
obtain a trigger signal;
activate a detection unit responsive to obtaining the trigger signal, wherein the detection unit is configured to measure vibrations caused by malicious events associated with a vehicle;
obtain an input from the detection unit responsive to activating the detection unit;
apply a first filter to the input:
identify a type of a malicious event associated with the vehicle based on applying the first filter to the input; and
control operation of a vehicle camera responsive to detecting the malicious event, wherein the vehicle camera is configured to capture a video feed in a camera field of view.

* * * * *